Sept. 27, 1932.   T. DUGAN   1,879,137
BEET HARVESTING MACHINE
Filed Oct. 6, 1930   2 Sheets-Sheet 1
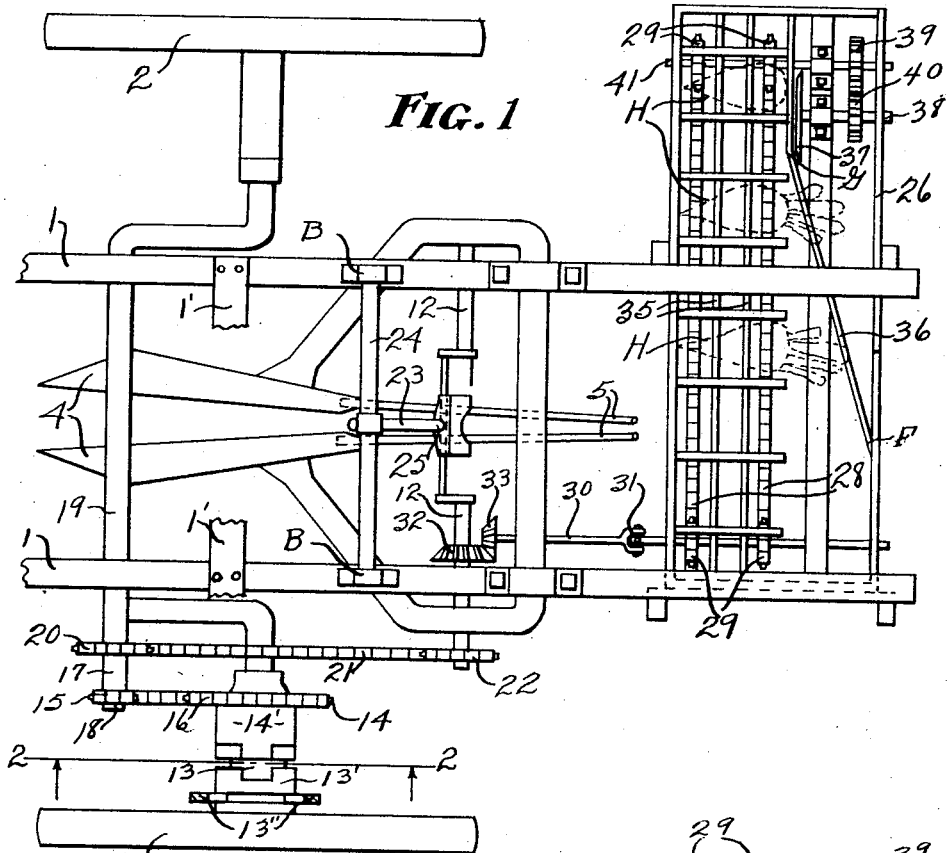
INVENTOR
Thomas Dugan
BY
E. G. Charles
ATTORNEY Sept. 27, 1932.　　　　　T. DUGAN　　　　　1,879,137
BEET HARVESTING MACHINE
Filed Oct. 6, 1930　　　2 Sheets-Sheet 2
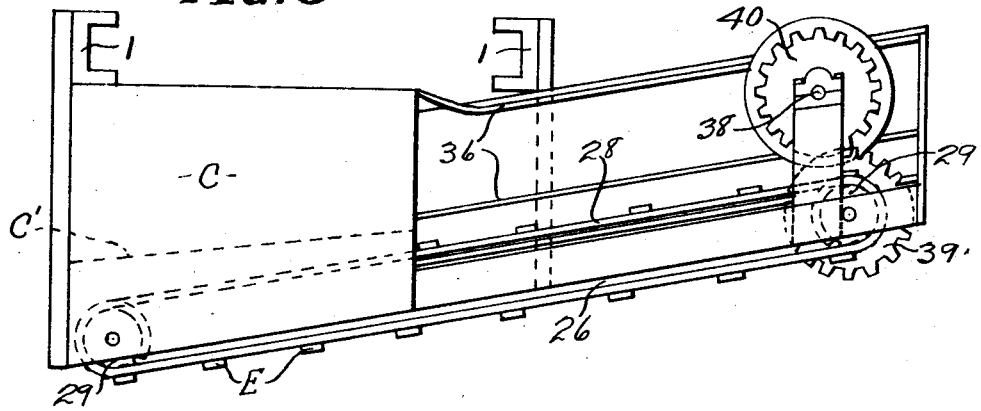
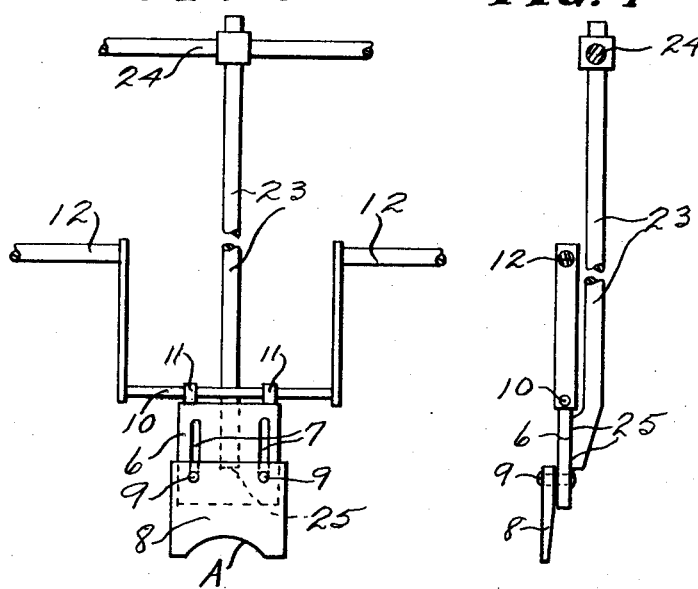
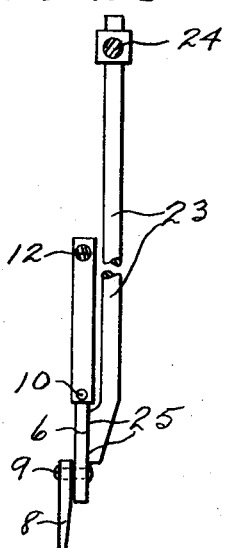
INVENTOR
Thomas Dugan
BY
ATTORNEY Patented Sept. 27, 1932

1,879,137

UNITED STATES PATENT OFFICE

THOMAS DUGAN, OF WICHITA, KANSAS, ASSIGNOR OF ONE-HALF TO ROBERT BENJAMIN DAVIS, OF WICHITA, KANSAS

BEET HARVESTING MACHINE

Application filed October 6, 1930. Serial No. 486,633.

My invention relates to improvements in a beet harvesting machine.

The object of my invention is to gather the beets as they are drawn from the ground and delivering them to a barge or the like.

A further object of my invention is to provide means to receive the beets as they are drawn from the ground and remove the soil therefrom preparatory to being conveyed thru a cutting mechanism for removing the tops therefrom as conveyed to a barge or the like, as transportation means to storage.

A still further object of my invention is to provide a cleansing, topping, and conveying means as an attachment to a beet harvesting machine, the said means being actuated by power transmitted from the wheel rotation of the beet harvesting machine as conveyed.

These and other objects will hereinafter be more fully explained, reference being had to the accompanying drawings which form a part of this specification, and in which like characters will apply to like parts in the different views.

Referring to the drawings:

Fig. 1 is a plan view of the beet harvesting machine and the attachments, parts being removed for the convenience of illustration.

Fig. 2 is a sectional view taken on line 2—2 in Fig. 1, and looking in the direction of the arrows.

Fig. 3 is a rear view of the conveyor and topping mechanism.

Fig. 4 is an enlarged side view of the shovel and fragmentary portion of the crank shaft.

Fig. 5 is a transverse view of Fig. 4 as the shovel would appear looking into the rear of the beet harvesting machine.

My invention herein disclosed is in combination with a beet harvesting machine consisting of a frame 1 carried by wheels 2 and 3, and a pair of plows 4.

This invention consists of a pair of fingers 5, there being one secured to the rear end of each of the plow elements, rearwardly extending and slanting upward, the said fingers functioning as a track to receive beets as the plow elements extract them from the ground. The beets are conveyed along the fingers thru the medium of a kicking element to a conveying element later described.

The kicking element consists of a body 6 having a pair of elongated slots 7 positioned therein, and each being spaced a short distance from its respective side of the body, by which means a shovel 8 is adjustably carried. The said shovel has a pin 9 secured thereto, each being in registry with its respective slot and adapted to slidably engage therein, and being secured by a head on the rear end of each of the pins and adapted to allow the shovel to slide vertically with a smooth running fit. It is understood that the said shovel portion will be positioned at its extreme downward movement by gravity as shown in Figs. 4 and 5. The lower end of said shovel portion is arcuated as at A to seat on the beets as it comes in contact therewith, and should the contact be directly on top or the crown of the beet, the shovel is free to retract upward to avoid serious damage by cleaving the same. In its succeeding approach, the contact with the beet may be properly effected, and the beet moved upward and rearward by the said kicking element in its movement which is accomplished thru the rotation of a crank 10, to which it is trunnioned by clips 11 secured to the upper end of the body near each corner thereof. The crank is intermediately positioned on a shaft 12 that I have trunnioned on the mechanism of the beet pulling machine, and actuated as follows.

On the inner hub 13 of wheel 3, which is the master wheel, is securely attached a sprocket wheel 14 aligned with a sprocket wheel 15 and being connected by a chain 16, the last said sprocket wheel being secured to a sleeve 17 that is trunnioned on a shaft 18, the shaft being rigidly attached to the axle 19 of the beet harvesting machine. A third sprocket wheel 20 is securely attached to said sleeve 17 and rotatable therewith, and having a chain 21 in mesh therewith and extending to a sprocket 22 that is secured to the outer end of the crank shaft 12. It is now readily seen that by forward movement of the machine the beets are plowed from the ground and moved upward and rearward as described.

To carry out the function of my invention, a clutch consisting of a notched hub 14' is integrally arranged on sprocket wheel 14 and rotatable therewith, a similar member 13' is slidably arranged longitudinally on hub 13 of wheel 3 to engage with first said notched hub, the last said hub being actuated by a yoke 13" that is pivotally arranged on a cross bar 1', but only partially shown in the drawings.

As a stabilizing means for a fixed position of the kick element as carried by the rotation of the crank, a guide rod 23 slidably engages in shaft 24 that is trunnioned on the upper side of the frame 1—1 as at B, and free to rock as the kick element is moved by the crank. It is understood that the lower end is integrally connected to the said body element of the kicker as at 25.

Pendantly supported from the frame elements 1—1 is an elevator consisting of a frame 26 having a cage 27 on the lower end thereof, the said cage having two sides and an end, the rear side C extends upward functioning as a stop for the beets when kicked thereagainst. The opposite or front side board is much lower as shown by the dotted lines C', and over this the beets will be thrown and deposited in contact with a conveyor 28, composed of a pair of sprocket chains D with cross bars E. The said conveyor being carried by a pair of sprocket wheels 29 that are trunnioned on opposite ends of the frame 26, the sprockets on the lower end of the conveyor are turned by a shaft 30 having a universal joint thereon. The said shaft is driven by a gear 32 secured to the shaft 12, the said gear is in mesh with a gear 33 that is secured to the end of the shaft 30, and is supported by a housing 34 as shown in Fig. 2, but removed in Fig. 1 for the convenience of illustration. It is understood that said housing is supported by a shaft 12 which rotates therein and also functions as a container for oil lubricating gears and bearings.

As a supporting means for the beets while being conveyed upward a pair of rods 35 extend longitudinally with the frame 26 and are carried thereby, and on these the beets will slide as moved upward by the conveyor. As a means to properly align the beets and remove the tops therefrom, a pair of rods 36 extend longitudinal with the conveyor frame and in approximate parallelism therewith, but having an inward slant from the rear side as shown in Fig. 1. The slant starts at the point F and terminates at the point G, and from thence rods 36 extend in parallel alignment with the side frame members 26, at which point a circle saw 37 is positioned and carried by a shaft 38 that is trunnioned on the frame, and is actuated by a train of gears 39 and 40. The gear 39 is positioned on shaft 41 as carrying means for the upper end of the conveyor and rotatable therewith, and in mesh with a gear 40 that is secured to shaft 38 on which the saw is mounted.

It is understood that the slanting position of the rods 36 is to convey the beets to proper aligned position as shown by dotted lines H as an indication of one of the beets. The said rods 36 spaced apart as shown in Fig. 3 are means to allow the beet tops to extend therethru as they approach the saw, and when severed they are free to drop downward. The beets may be deposited in a conveying means independent of the machine or may be conveyed thereby, the said means not being shown in the drawings.

It is now shown that by the manner of conveying the beets from the plows thru the medium of the pulsative picking arrangement and further elevating process, the soil that may adhere to the beets is practically removed before the final delivery for transporting the beets to storage.

While I have shown a beet harvesting machine of a certain type, I do not wish to be confined to such as my attachment may be applied to other styles, and the mode of connecting the elements of my invention may be varied, and such other modifications may be employed as lie within the scope of the appended claims.

Having fully described my invention what I claim as new and desire to secure by Letters Patent is:—

1. In combination with a beet harvesting machine having a frame and a pair of plows and an axle and wheels to carry the same, a train of sprocket wheels and chains extending from one of the wheels as a master wheel, and a clutch to control the train, a crank shaft trunnioned on the frame of the machine and geared in the train, a kick element carried by the crank, the said element having a body portion and a rod extending therefrom and rigidly attached, a guide element rockably trunnioned on the frame and in which the rod slidably engages as a stabilizer for the kick element, the body portion having a shovel to slidably engage thereon, a finger element attached to the rear portion of each of the plows, rearwardly extending and slanting upward as receiving means for the beets as they are pulled by the plows, the beets being moved rearward by the kick element, and a conveyor carried by the frame of the machine to receive the beets, and a cutting element to remove the tops therefrom as conveyed, a shaft and gears connecting the same to the crank shafts as actuating means for the conveyor, and the cutting mechanism actuated by the movement of the conveyor, substantially as shown.

2. In combination with a beet harvesting machine consisting of plow elements carried by a frame and axle and wheels trunnioned on the axle, a conveyor carried by the frame, the said conveyor having a plurality of rods in the bottom thereof, and a side board on the front, a plurality of rods on the other side and being spaced apart vertically and slanting inward longitudinally, a shaft, trunnioned at each end of the conveyor, and each having a pair of sprockets secured thereto, and a pair of chains carried by the sprockets, the chains being connected by a plurality of cross bars, means to rotate the shafts of the machine as conveyed, a saw positioned in close proximity to the inner ends of the last said rods, the saw being actuated by a train of gears connecting the same to one of the shafts, means to convey the beets from the plow elements to the conveyor, all substantially as shown.

3. In combination with a beet harvesting machine, a conveyor rearwardly positioned and carried by the machine, the conveyor comprising a frame with a front side board and a plurality of rods spaced apart for the bottom and longitudinally positioned therewith, and on which beets rest as conveyed, a pair of rods for the other side of the frame, spaced apart vertically and slanting inward longitudinally, and a cutting mechanism operatively positioned at the termination of the inner end portion, by which means tops of the beets may extend outward between the last said rods and be severed as they pass the cutting mechanism, and a conveyor belt to move the beets longitudinally along and from the frame, a receiving means for the beets between the machine and the conveyor, and means to kick the beets therefrom into the conveyor.

In testimony whereof I affix my signature.

THOMAS DUGAN.